US009783896B2

(12) United States Patent
Turkustani et al.

(10) Patent No.: US 9,783,896 B2
(45) Date of Patent: Oct. 10, 2017

(54) *OLEA EUROPAEA* SUBSP. CUSPIDATE WOOD TAR OIL COMPOSITION AS AN ANTICORROSIVE FOR METALS IN AQUEOUS MEDIA

(71) Applicant: King Abdulaziz University, Jeddah (SA)

(72) Inventors: Aisha Mahmood Abdulkareem Turkustani, Jeddah (SA); Nehad Mahmoud Mostafa Gumgumjee, Jeddah (SA); A. S. Hajar, Jeddah (SA)

(73) Assignee: King Abdulaziz University, Jeddah (SA)

( * ) Notice: Subject to any disclaimer, the term of this patent is extended or adjusted under 35 U.S.C. 154(b) by 17 days.

(21) Appl. No.: 15/041,219

(22) Filed: Feb. 11, 2016

(65) Prior Publication Data
US 2017/0233873 A1  Aug. 17, 2017

(51) Int. Cl.
C23F 11/00 (2006.01)
C23F 11/12 (2006.01)
C23F 11/14 (2006.01)
C23F 11/16 (2006.01)
C23F 11/167 (2006.01)
C23F 11/10 (2006.01)

(52) U.S. Cl.
CPC .......... *C23F 11/10* (2013.01); *C23F 11/12* (2013.01); *C23F 11/142* (2013.01); *C23F 11/16* (2013.01); *C23F 11/167* (2013.01)

(58) Field of Classification Search
None
See application file for complete search history.

(56) References Cited

U.S. PATENT DOCUMENTS

| 1,558,446 | A | * | 10/1925 | Maze | .................. | C09D 101/18 |
| | | | | | | 106/169.54 |
| 1,590,156 | A | * | 6/1926 | Ellis | ....................... | C08K 5/10 |
| | | | | | | 106/311 |
| 1,844,983 | A | * | 2/1932 | Schladebach | ........ | C09D 101/26 |
| | | | | | | 106/175.1 |
| 2,148,862 | A | * | 2/1939 | Kern | ..................... | C09D 5/084 |
| | | | | | | 106/14.39 |

(Continued)

FOREIGN PATENT DOCUMENTS

CN    102499266 A    6/2012

OTHER PUBLICATIONS

Abstract: "Antibacterial and phytochemical properties of Qutran (wood tar) from *Olea europaea* subsp. cuspidate growing in Saudi Arabia (Al Bahah district)", Abdul Rahman Hajar et al., Biol syst Open Access Jul. 18-20, 2016, 5:2 (Suppl).*

(Continued)

*Primary Examiner* — Joseph D Anthony
(74) *Attorney, Agent, or Firm* — Oblon, McClelland, Maier & Neustadt, L.L.P.

(57) ABSTRACT

A composition and a method for inhibiting corrosion of a metal by contacting a metal surface with the composition. The composition includes a wood tar oil, from an *Olea europaea* subsp. Cuspidate plant, and an alcohol solvent. The wood tar oil is present at 5%-80% v/v relative to the total volume of the composition, and the alcohol solvent is present at 10%-95% v/v relative to the total volume of the composition. The composition has a coating resistance of greater than 2.5 ohms and inhibits corrosion of a metal.

18 Claims, 4 Drawing Sheets

| Conc. % v/v | Polarisation | | | | Impedance | | | Inhibition (%) | |
|---|---|---|---|---|---|---|---|---|---|
| | $-E_{corr}$ | $I_{corr}$ | $b_a$ | $b_c$ | $R_{sol}$ | $R_{ct}$ | $C_{dl} \times 10^3$ | $Inh_{Icorr}$ (%) | $Inh_{Rct}$ (%) |
| 0.0 | 454.98 | 50.119 | 148.63 | 180.50 | 0.3918 | 1.404 | 3.119 | -- | -- |
| 1.0 | 470.22 | 21.965 | 83.89 | 139.12 | 0.4267 | 3.233 | 2.296 | 56.17 | 56.57 |
| 3.0 | 484.45 | 18.438 | 62.54 | 132.65 | 0.4322 | 4.766 | 1.091 | 63.21 | 70.54 |
| 5.0 | 486.49 | 12.674 | 56.63 | 132.54 | 0.4409 | 6.766 | 0.9205 | 74.71 | 83.68 |
| 7.0 | 490.62 | 7.7080 | 55.11 | 140.01 | 0.4451 | 9.648 | 0.3705 | 84.62 | 85.44 |
| 10.0 | 491.57 | 2.5190 | 49.49 | 108.15 | 0.4915 | 27.26 | 0.1204 | 94.97 | 94.85 |

(56) References Cited

U.S. PATENT DOCUMENTS

| | | | | |
|---|---|---|---|---|
| 2,258,578 | A | * | 10/1941 | Chesley .................. C23G 1/06 |
| | | | | 252/389.52 |
| 2,881,084 | A | * | 4/1959 | Watkins ................. D21H 17/62 |
| | | | | 106/219 |
| 3,043,783 | A | * | 7/1962 | Hatcher ................ C10L 1/2283 |
| | | | | 252/401 |
| 6,512,090 | B1 | * | 1/2003 | Suchanec .............. C08L 95/005 |
| | | | | 106/220 |

OTHER PUBLICATIONS

Al-Asmari, A., et al., "The Antibacterial Effect of Qutran (Wood Tar) from Olive Trees on Pathogenic Bacteria", International Journal of Phytomedicine, vol. 6, No. 3, pp. 444-447, (2014).

Benlarbi, L., et al., "Biological Activities of *Olea Europea Sylvestris* Tar, Growing Wild in South West of Algeria", International Journal of Current Microbiology and Applied Sciences, vol. 3, No. 8, pp. 771-777, (2014).

* cited by examiner

*OLEA EUROPAEA* SUBSP. CUSPIDATE WOOD TAR OIL COMPOSITION AS AN ANTICORROSIVE FOR METALS IN AQUEOUS MEDIA

BACKGROUND OF THE INVENTION

Technical Field

The present invention relates to a plant derived anti-corrosive composition containing *Olea europaea* subsp. Cuspidate wood tar oil that inhibits the dissolution of metals in aqueous media, including aqueous acids or alkaloids.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Historically, the main use of heavy wood tar oil was as a waterproofing agent to preserve wooden vessels and objects against rot. Mid and light wood tar oils were also used as wood protectors, varnish, and glossing agents. A dilution of wood tar oil called "tar water" has numerous uses including a flavoring for candies and alcohol, a spice for food, a scent for steam saunas, an anti-dandruff agent in shampoo, and as an ingredient in cosmetics.

Metal corrosion is a continuous and persistent problem in all industries and especially in water treatment. The use of toxic chemicals to inhibit corrosion in piping systems and on metal surfaces during water treatment and in caustic cleaning procedures in industries may endanger public safety, environmental safety, and may be costly to clean up before releasing the water out of a facility. The indiscriminate use of synthetic inhibitors that hinder metal corrosion have resulted in the release of pollutants into the environment that cannot be easily degraded or contained. The development of effective natural alternatives, such as plant derived products, with limited or no side effects is an active area of research interest in the anti-corrosive industry.

In view of the forgoing, the objective of the present invention is to provide a composition of wood tar oil from *Olea europaea* subsp. Cuspidate in an alcohol solvent with anti-corrosive properties and a method of using the composition to prevent corrosion of a metal.

BRIEF SUMMARY OF THE INVENTION

According to a first aspect, the present disclosure relates to a composition having a wood tar oil from an *Olea europaea* subsp. Cuspidate plant, in which the wood tar oil is present in 5%-80% v/v relative to the total volume of the composition, and an alcohol solvent that is present in 10%-95% v/v relative to the total volume of the composition, wherein the composition has a coating resistance of greater than 2.5 ohms and inhibits corrosion of a metal.

In some formulations, the composition further comprises a dispersant.

In some formulations, the dispersant of the composition is at least one of an anionic surfactant, a cationic surfactant, a neutral surfactant, and a gemini surfactant.

In some formulations, the dispersant of the composition is present in at least 0.5%-10% v/v relative to the total volume of the composition.

In some formulations, the composition further comprises at least one inorganic inhibitor compound selected from the group consisting of a phosphate ester containing compound, a silicate containing compound, a molybdenum containing compound, and a boric acid containing compound, wherein the inorganic inhibitor compound inhibits dissolution and acid depletion of the metal.

In some formulations, the inorganic inhibitor compound is present in 0.5%-10% v/v relative to the total volume of the composition.

In some formulations, the composition further comprises at least one organic inhibitor compound selected from the group consisting of an amine-containing compound, a heterocyclic nitrogen-containing compound, a sulfur-containing compound, an acetylenic compound, and an aldehyde compound, wherein the organic inhibitor compound inhibits dissolution and acid depletion of the metal.

In some formulations, the organic inhibitor compound is present in 0.5%-10% v/v relative to the total volume of the composition.

In some formulations, the wood tar oil has a viscosity between 1.2 and 2.0 millipoise.

In some formulations, the wood tar oil comprises creosote, wood tar, terpene oil, neutral oil, and mono- and poly-phenolic compounds.

In some formulations, the wood tar oil is modified by at least one chemical modification selected from the group of hydrogenation, epoxidation, hydroxylation, halogenation, sulfonation, phosphorylation, and amidation.

In some formulations, the composition further comprises an anti-scalant compound, wherein the anti-scalant compound is present in 0.5%-10% v/v relative to the total volume of the composition.

In some formulations, the composition is formulated into a paint, a polymer coating, or an epoxy.

In some formulations, the metal is a low to medium carbon steel with a carbon content of 0.04%-0.6% by weight.

In some formulations, the wood tar oil is obtained by a destructive distillation of an extracted portion from the *Olea europaea* subsp. Cuspidate plant.

According to a second aspect, the present disclosure relates to a method for inhibiting corrosion of a metal including contacting a metal surface with a composition comprising wood tar oil present in 5%-80% and an alcohol present in 10%-95% v/v relative to the total volume of the composition.

In some implementations of the method, the composition further comprises 0.5%-10% v/v of at least one of a dispersant, an organic inhibitor compound, an inorganic inhibitor compound, and an anti-sealant compound, relative to the total volume of the composition.

In some implementations of the method, the composition has a temperature between 20° C.-40° C. when the composition is contacting the metal.

In some implementations of the method, the contacting includes dipping, brushing, spraying, painting, or spin coating the metal surface with the composition.

In some implementations, the method includes contacting the metal surface with a secondary anti-corrosive compound after contacting the metal surface with the composition.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
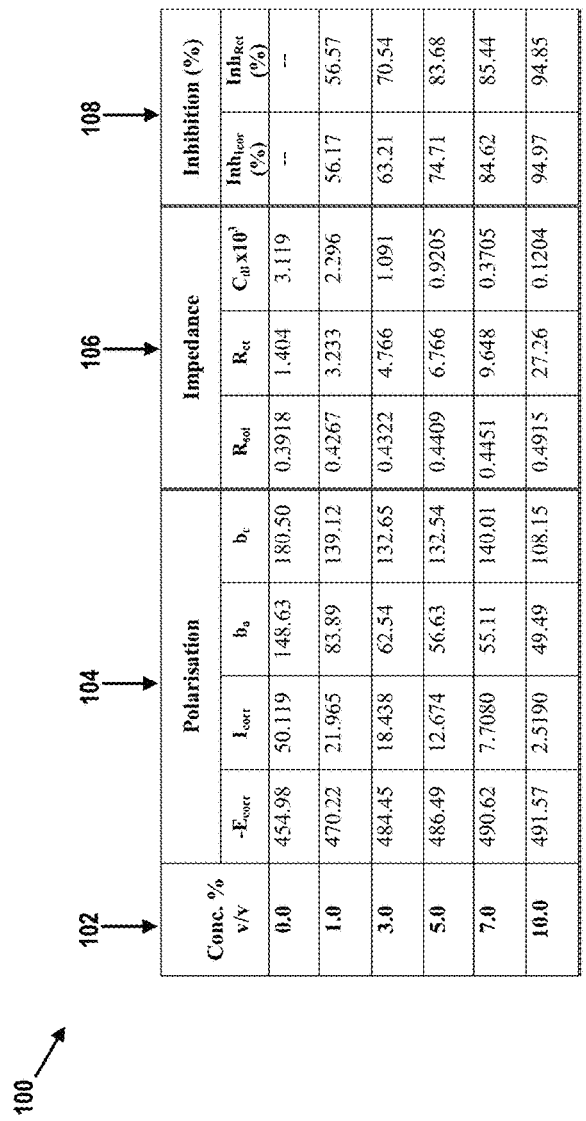
FIG. 1 is a table of electrochemical parameters and inhibition efficiencies as a result of increasing concentration of the composition on a metal.

Referring now to the drawings, wherein like reference numerals designate identical or corresponding parts throughout the several views.

Aspects of the present disclosure are directed toward a composition having wood tar oil from an *Olea europaea* subsp. Cuspidate plant, and an alcohol solvent. The composition inhibits corrosion of a metal. The wood tar oil obtained from *Olea europaea* subsp. Cuspidate plant is preferably obtained by destructive distillation of the the *Olea europaea* subsp. Cuspidate plant and/or an extracted portion from the *Olea europaea* subsp. Cuspidate plant.

In some implementations, the metal may be a low to medium carbon steel with a carbon content of 0.04%-0.6% by weight. The metal may also have at least one of molybdenum, manganese, chromium, silicon, phosphate, aluminum, or nickel content from 0.1%-12% by weight.

In some implementations, the composition may inhibit corrosion in a larger family of metals including but not limited to copper, copper alloys (e.g. brass or bronze), aluminum alloys (e.g. aluminum-magnesium, nickel-aluminum, aluminum-silicon), and nickel alloys (e.g. nickel-titanium or nickel-chromium).

In some implementations, the composition may impart a coating resistance of greater than 0.5 ohms, greater than 0.75 ohms, greater than 1.0 ohms, greater than 1.5 ohms, greater than 2.0 ohms, preferably greater than 2.5 ohms. The coating resistance as described herein, is a measurement of impedance by electrochemical impedance spectroscopy. The coating resistance is a measurement resulting from applying Ohm's law to a reduction in current of an applied voltage, detected in the presence and absence of a coating. As described herein, the composition is the coating and the resistance is measured in the presence of the composition on the metal and in the absence of the composition on the metal.

Destructive distillation is a chemical process to decompose a feedstock of organic matter by heating to a high temperature resulting in pyrolysis of compounds in the organic matter. Prior to the destructive distillation, an extracted portion is preferably obtained from a raw material of the *Olea europaea* subsp. Cuspidate plant that may include, but is not limited to bark, leaves, roots, flowers, seeds, and preferably stems. A condition of the raw material may be fresh or desiccated. The raw material may be harvested at a flowering stage of the *Olea europaea* subsp. Cuspidate plant or harvested at a dormant stage of the *Olea europaea* subsp. Cuspidate plant. The raw material may be sterilized by processes including, but not limited to UV irradiation, dry heat, steam sterilization (autoclave), nitrogen dioxide dispersion, and spraying with a liquid disinfectant. Once sterilized the raw material may be rinsed to remove any solvents used in sterilization, then the raw material may be divided into smaller pieces, by cutting, chopping, shredding, mashing and the like. The small pieces of the raw materials are then preferably exposed to an aqueous buffered solution and the supernatant is collected. The supernatant is then distilled by destructive distillation. Destructive distillation yields the wood tar oil which may be colored a light amber to a deep brown and almost black color.

The wood tar oil may contain other oils such as creosote, wood tar, terpene oil, neutral oil, and mono- and poly-phenolic compounds. The terpene oil may include, but is not limited to eugenol or 2-methyl-2-cyclopenten-1-one. Mono- and poly-phenolic compounds may include but are not limited to cresol, 3,4-dimethyl phenol, and 1,2-benzenediol. Neutral oil may include, but is not limited to oleic acid, linoleic acid, palmitic acid. Wood tar may include, but is not limited to dimethylpyrogallol, 3,4-benzopyrene, and methylcyclopentenolone.

In some formulations, it may be preferred to chemically modify the wood tar oil. The wood tar oil may be chemically modified by processes including, but not limited to, hydrogenation, epoxidation, hydroxylation, halogenation, sulfonation, phosphorylation, and amidation. For example, the wood tar oil may be hydrogenated by bubbling hydrogen gas through the wood tar oil in the presence of a hydrogenation catalyst (e.g. a palladium or platinum catalyst), or selectively hydrogenated by a selective hydrogenation catalyst, e.g. chlorotris(triphenylphosphine)rhodium(I) ($RhCl(PPh_3)_3$). The hydrogenation catalysts which may be used for modifying the wood tar oil in the composition are known to those of ordinary skill in the art. In another example, the wood tar oil may be epoxidized by an oxidant (e.g. sodium hypochlorite) alone, or in the presence of an epoxidation catalyst (e.g. a N,N'-bis(3,5-di-tert-butyl salicylidene)-1,2-cyclohexanediaminomanganese(III) chloride catalyst, or another salen-type epoxidation catalyst). In another example, the wood tar oil may be hydroxylated by reaction with osmium or permanganate oxidants alone, or in the presence of a hydroxylation catalyst (e.g. Sharpless dihydroxylation catalysts). In another example, the wood tar oil may be halogenated for example by hydrohalogenation with an hydrohalic acid such as hydrogen bromide or hydrogen chloride. In another example, the wood tar oil may be sulfonated for example by reaction with sulfur trioxide in fuming sulfuric acid. In another example, the wood tar oil may be phosphorylated, for instance by reacting trichloroacetonitrile and dihydrogenphosphate with the wood tar oil. In one example, aldehydes functional groups in the wood tar oil may be amidated by reacting hydrogen azide with the wood tar oil (e.g. Schmidt reaction).

In some formulations, the wood tar oil may have a viscosity between 0.2 millipoise (mP) and 3.0 mP, between 0.5 mP and 2.5 mP, between 1.0 mP and 2.3 mP, preferably between 1.2 mP and 2.0 mP.

The composition may contain a percent volume of wood tar oil relative to the total volume of the composition of at least 5%, at least 10%, at least 15%, at least 20%, at least 30% at least 40%, at least 50%, at least 60%, at least 70%, and at least 80%. The composition may contain a percent volume of alcohol solvent relative to the total volume of the composition of at least 5%, at least 10%, at least 15%, at least 20%, at least 25% at least 35%, at least 45%, at least 55%, at least 65%, at least 75%, at least 85%, and at least 95%.

In some formulations, the alcohol solvent may include, but is not limited to primary, secondary, and tertiary alcohols such as methanol, ethanol, isopropyl alcohol, 2-methylbutan-2-ol, or alkanolamines, such as ethanolamine, diethylethanolamine, or methyldiethanolamine. In some formulations, the alcohol solvent may have a boiling point of at least 25° C., at least 35° C., at least 45° C., at least 55° C., at least 75° C., at least 100° C., at least 125° C., and at least 150° C.

In some formulations the composition further includes a dispersant, which may be at least one of an anionic surfactant, a cationic surfactant, a neutral surfactant, and a gemini surfactant. The dispersant allows immiscible chemical compounds to form a more evenly distributed solution. Surfactants are a type of dispersant that reduces the surface tension between two liquids or between a liquid and a solid. Surfactants may also be known as wetting agents or emulsifiers. Surfactants can be further subdivided into anionic, cationic, neutral, zwitterionic, or gemini. The purpose of including different types of surfactants in the composition of the present disclosure is to provide formulations that are intended for use with various types of metals or environmental variations such as temperature, humidity, and direct irradiation, or miscibility with other additives. In some formulations, the anionic surfactant may produce foaming in the composition. In some formulations, the cationic surfactant may prevent foaming in a composition. In some formulations, the neutral surfactant may avoid interaction with salts in the composition. In some formulations, the zwitterionic surfactant may produce a heavy foam and suds in the composition. In some formulations, the gemini surfactant may produce foam, suds, or salt interactions based on temperature, pH, or salinity. The anionic surfactant may include, but is not limited to sodium stearate, sodium dodecylbenzene sulfonate, and sodium dodecyl sulfate. The cationic surfactant may include, but is not limited to trimethylhexadecyl ammonium chloride, cetylpyridinium chloride, di-dodecyl-benzyl-triethyl ammonium chloride. The nonionic surfactant may include, but is not limited to polyethylene ethoxylate, pluranic P123 (polymer), and lauryl mono-ethanol. The gemini surfactant may include, but is not limited to 1,2-ethanediyl bis-(dimethylalkylammonium bromide), N-hexane-diyl-1,2-ethane-bis ammonium bromide, N-dodecane-diyl-1,2-ethane-bis ammonium bromide, and N-hexadecane-diyl-1,2-ethane-bis ammonium bromide. The composition may contain a percent volume of the dispersant relative to the total volume of the composition of at least 0.5%, at least 1.0%, at least 2.0%, at least 3.0%, at least 4.0%, at least 5.0%, at least 6.0%, at least 7.0%, at least 8.0%, at least 9.0%, at least 10%, at least 12.0%, at least 15.0%, at least 18% and at least 20%.

In some formulations, the composition may include an inorganic inhibitor compound (e.g those inhibitor compounds which may contain metal, silicon, boron, or halogen atoms) or an organic inhibitor compound (e.g. those inhibitor compounds which contain only carbon, nitrogen, oxygen, sulfur, and hydrogen) in addition to the wood tar oil. The inorganic inhibitor compound and the organic inhibitor compound may have mechanisms of preventing corrosion for some metal alloys which are complementary to the wood tar oil. The various mechanisms by which inhibitor compounds prevent corrosion may include but are not limited to adsorption, crosslinking, alternative oxidants, passivation, salt precipitate nucleating, and metal complexation.

In some formulations, the composition may include at least one inorganic inhibitor compound selected from the group consisting of a phosphate ester containing compound, a silicate containing compound, a molybdenum containing compound, and a boric acid containing compound. The inorganic inhibitor compound may inhibit dissolution and acid depletion of the metal. Dissolution is a result of an atom of the metal separates from a solid form of the metal. Dissolution is usually a result of an oxidation of the atom. Acid depletion reduces the electrons left on the solid form of the metal by the dissolution. Dissolution and acid depletion together result in corrosion of the metal. The phosphate ester containing compounds may include, but are not limited to zinc phosphate, trisodium phosphate, or tetrapotassium pyrophosphate. The silicate containing compound may include, but is not limited to calcium boro silicate, strontium phosphosilicate, or commercial silicates such as N® Silicate by the PQ Corporation or Accepta® 2536 by Accepta Advanced Environmental Technologies. The molybdenum containing compound may include, but is not limited to sodium molybdate, calcium molybdate, and zinc phosphomolybdate. The boric acid containing compound may include, but is not limited to commercial products like REWOCOROS® RA B 60 S made by Evonik Industries or Accepta® 2542 by Accepta Advanced Environmental Technologies.

In some formulations, the composition may contain a percent volume of the inorganic inhibitor compound relative to the total volume of the composition of at least 0.5%, at least 1.0%, at least 2.0%, at least 3.0%, at least 4.0%, at least 5.0%, at least 6.0%, at least 7.0%, at least 8.0%, at least 9.0%, at least 10%, at least 12.0%, at least 15.0%, at least 18% and at least 20%.

In some formulations, the composition may include at least one organic inhibitor compound selected from the group consisting of an amine-containing compound, a heterocyclic nitrogen-containing compound, a sulfur-containing compound, an acetylenic compound, and an aldehyde compound. The organic inhibitor compound may inhibit dissolution and acid depletion of the metal as described above for the inorganic inhibitor compound. The amine-containing compound may include, but is not limited to hydrogenated tallow amine acetate, N,N-diethylhydroxylamine, or 3-Methoxypropylamine. The heterocyclic nitrogen-containing compound may include, but is not limited to dodecylbenzyl quinolinium bromide, and hexadecylpyridinium. The sulfur-containing compound may include, but is not limited to dinonylnaphthalene sulfonate, thiourea, and thiobarbituric acid. The acetylenic compound may include, but is not limited to propargyl alcohol, methyl butynol, and 2-butyne-1,4-diol. The aldehyde containing compound may include, but is not limited to hydroxynapthaldehyde, decenal, dicinnamaldehyde.

In some formulations, the composition may contain a volume of the organic inhibitor compound relative to the total volume of the composition of at least 0.5%, at least 1.0%, at least 2.0%, at least 3.0%, at least 4.0%, at least 5.0%, at least 6.0%, at least 7.0%, at least 8.0%, at least 9.0%, at least 10%, at least 12.0%, at least 15.0%, at least 18% and at least 20%.

In some formulations, the composition may include an anti-scalant compound. The anti-sealant compound can prevent a build-up of salts which can promote galvanic corrosion to the metals. Galvanic corrosion results when two metals or two areas of the same metal object corrode at different rates due to a build-up of a salt or electrolytes on one of the two metals or one of the two areas of the same metal object. The anti-scalant compound may include, but is not limited to penta-sodium salt of aminotri(methylene phosphonic acid), the hexa-potassium salt of hexamethylenediamine tetra(methylene-phosphonic acid), and the hepta-sodium salt diethylenetriamine penta(methylene phosphonic acid). In some formulations, the composition may contain a volume of the anti-scalant compound relative to the total volume of the composition of at least 0.5%, at least 1.0%, at least 2.0%, at least 3.0%, at least 4.0%, at least 5.0%, at least 6.0%, at least 7.0%, at least 8.0%, at least 9.0%, at least 10%, at least 12.0%, at least 15.0%, at least 18% and at least 20%. Anti-scalant compounds may inhibit forms of scale including, but not limited to carbonate deposits, sulphate deposits, silica deposits, and iron deposits. Examples of scale may be calcium carbonate or calcium sulfate.

In some formulations, the composition may be formulated into a paint, a polymer coating, or an epoxy. In some formulations paint, polymer coating, or epoxy may have a pigment. The paint, polymer coating, or epoxy may be applied to the metal by dipping, brushing, spraying, painting, or spin coating the metal surface with the composition. Dipping is a process in which an object or surface is immersed in a container filled with the composition to adhere the composition to the surface or object. Dipping may be followed by draining off an excess of the composition from the object or surface and then drying or baking the object or surface to solidify or dry the composition on to the object or surface. Brushing may include employing bristles to apply the composition on to the object or surface. Brushing may not provide an even coating to the surface or object and may be more suitable for flat shapes. Spraying may involve an air pressurized nozzle to transfer the composition onto a surface. The spraying may include a heating unit to retain the composition at low viscosity for a more evenly dispersed spray profile. The low viscosity may be a viscosity less than 1.2 mP, less than 1.0 mP, less than 0.75 mP, or less than 0.5 mP. Painting, as defined herein, refers to application of the composition with rollers or spraying without the air pressurized nozzle on to the object or surface. Spin coating is a procedure which can deposit the composition uniformly on the surface of a flat object. In spin coating the composition may be applied to the center of the surface and then the surface is spun at varying degrees of speed to spread the composition over the surface by centrifugal force. In spin coating, any excess of the composition can spin off the edges of the surface.

In some formulations, the composition may be dried onto the surface of the metal to form a coating to inhibit corrosion. The coating may be cured by UV irradiation or heat resulting in chemical modification or crosslinking components of the composition.

In some formulations, the composition may form a varnish on the surface of the metal. The composition may be dried onto the surface of the metal and, through natural oxidation, heat induced oxidation, or heat and pressure induced oxidation of the composition, radicals may form and result in a crosslinking of the composition. The crosslinking of the composition may form the varnish. The crosslinking may also result from chemical modification by processes including, but not limited to, hydrogenation, epoxidation, hydroxylation, halogenation, sulfonation, phosphorylation, and amidation as described above.

According to another aspect, the present disclosure describes a method for inhibiting corrosion of a metal, including contacting a metal surface with a composition having wood tar oil and an alcohol. The wood tar oil and the alcohol may be present in a volume relative to the total volume of the composition as described above. The composition may further include a dispersant, an organic inhibitor compound, and inorganic inhibitor compound, and an anti-sealant compound, in a volume relative to the total volume of the composition as described above. In some implementations, the method of contacting the metal with the composition may include dipping, brushing, spraying, painting, or spin coating as described above. In some implementations, the method of contacting the metal with the composition may include the coating of the composition onto the metal by curing or crosslinking as described above.

In some implementations, the contacting may occur in forms of aqueous media including, but not limited to seawater, freshwater, brine water, or combinations thereof. In some implementations, the aqueous media may have a pH range of pH 1-pH 8. In some implementations, acidic compounds in the media may include, but are not limited to sulfuric acid, acetic acid, citric acid, chlorous acid, hydrochloric acid, or nitric acid.

In some implementations, the composition may be added as a concentrate into a volume of liquid in a metal piping system or container which holds or circulates liquids that may corrode the metal piping system or the metal container. The composition may be diluted by a volume of liquid by more than 5 times, more than 10 times, more than 25 times, more than 50 times, more than 75 times, more than 100 times, and more than 150 times.

In some implementations, the composition has a temperature between 5° C.-55° C., between 10° C.-50° C., between 15° C.-45° C., and most preferably between 20° C.-40° C. when the composition is contacting the metal. The temperature of the composition may improve anti-corrosive interaction with the metal.

In some implementations, the composition may prevent corrosion on metals during high temperature processes such as inside engines, ball bearings, axles, boilers, air compressors, battery terminals, or turbines.

In some implementations, the method further includes contacting the metal surface with a secondary anti-corrosive compound after contacting the metal surface with the composition described herein, in one or more of its formulations. The secondary anti-corrosive compound may include but is not limited to an inorganic or organic phosphosilicate compound, for example a commercial anti-corrosive compound such as HALOX® 750 corrosion inhibitor or and inorganic of organic phenolic acid compound, such as HALOX® RC-980 rust converting additive by ICL/Advanced Additives. The secondary anti-corrosive may inhibit corrosion by a complementary mechanism to the composition.

In some implementations, contacting the metal with the composition may result in a percent inhibition efficiency of at least 50%. In FIG. 1, the percent inhibition efficiency was determined by a corrected current ($I_{corr}$) 104. A difference was calculated between the corrected current without the presence of the composition and the corrected current in the presence of the composition. The percent inhibition efficiency was calculated by a quotient of the difference and the corrected current without the presence of the composition, multiplied by 100.

The examples below are intended to further illustrate protocols for characterizing the composition of wood tar oil from *O. europaea* subsp. Cuspidate and uses thereof, and are not intended to limit the scope of the claims.

EXAMPLE 1

Detailed Description and Embodiment & Data Analysis:
*O. europaea* subsp. Cuspidate Wood Tar oil (Viscosity=1.8689 millipoise) was extracted using destructive distillation, and collected during May, 2014 from Albahah district (19° 59'14.12"N, 41° 27'53.01"E) southwest Saudi Arabia from the summit at 2242 M.A.S.L. Species status of this plant was verified at Faculty of Sciences, Herbarium (Serial No. 1597), King Abdul-Aziz University, Jeddah.

Figure 2:
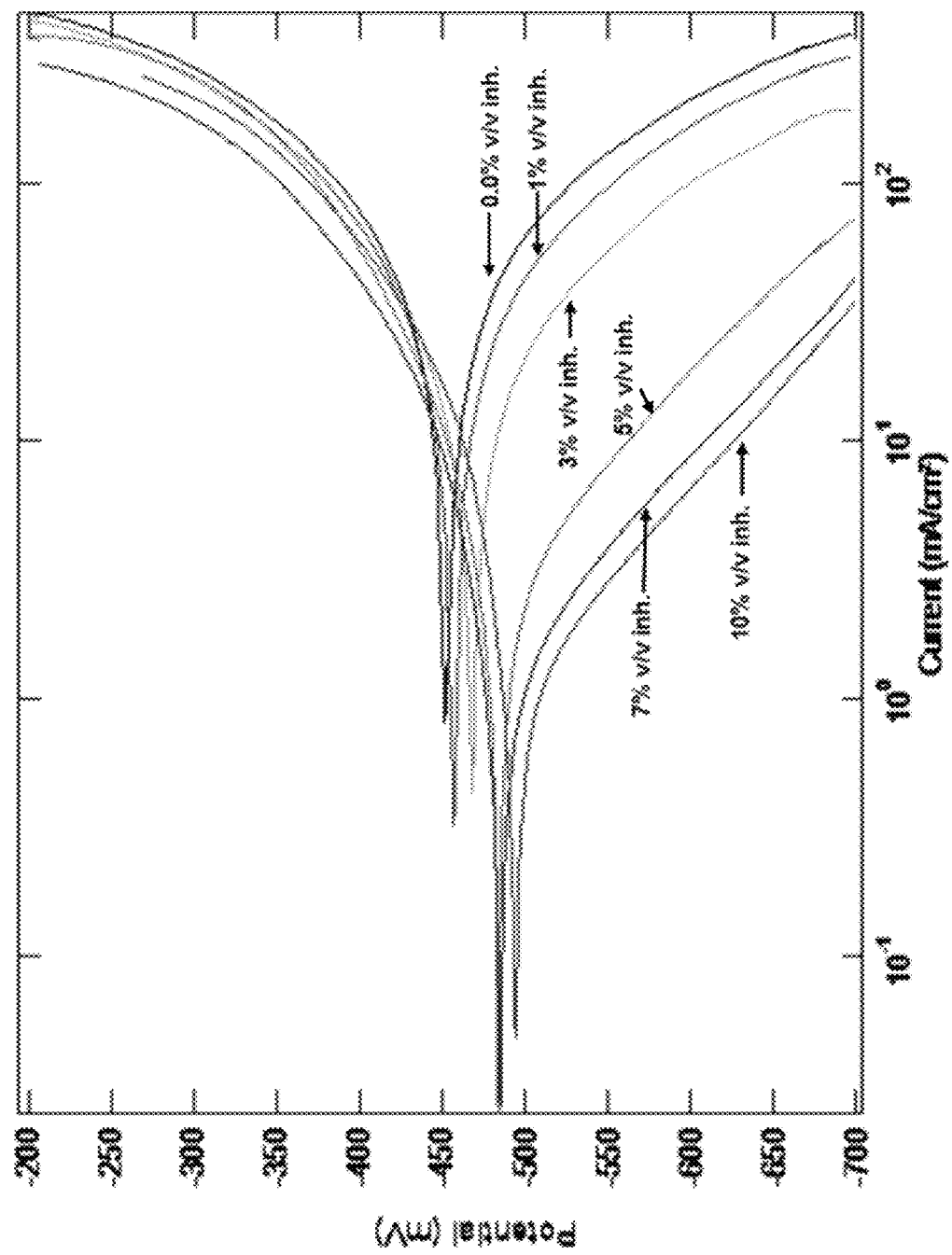
FIG. 2 is a graphical plot of the resistance as a result of increasing concentration of the composition on the metal.
Figure 3:
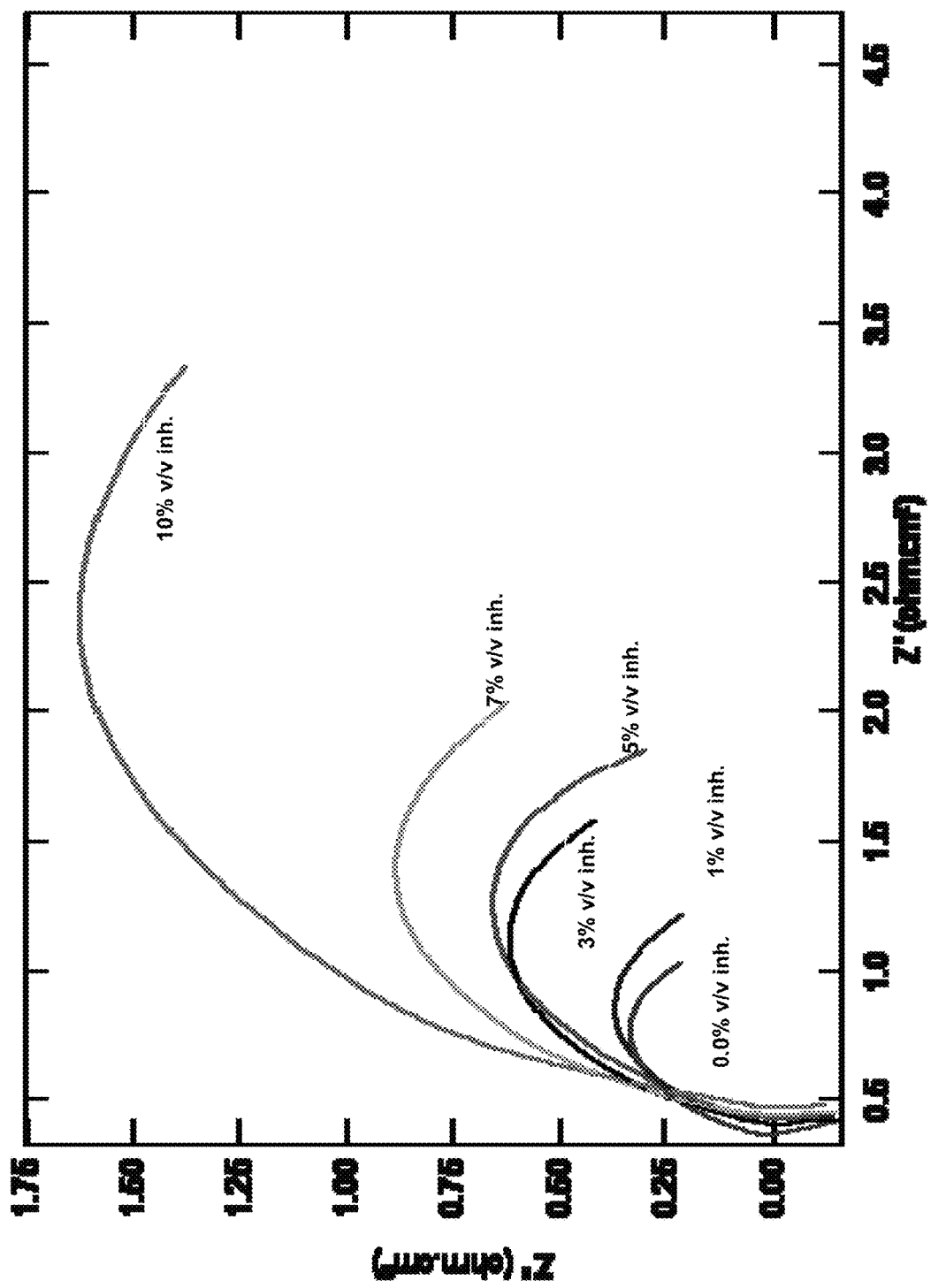
FIG. 3 is a graphical plot of the resistance to current flow as a result of increasing concentration of the composition on the metal.
Figure 4B:
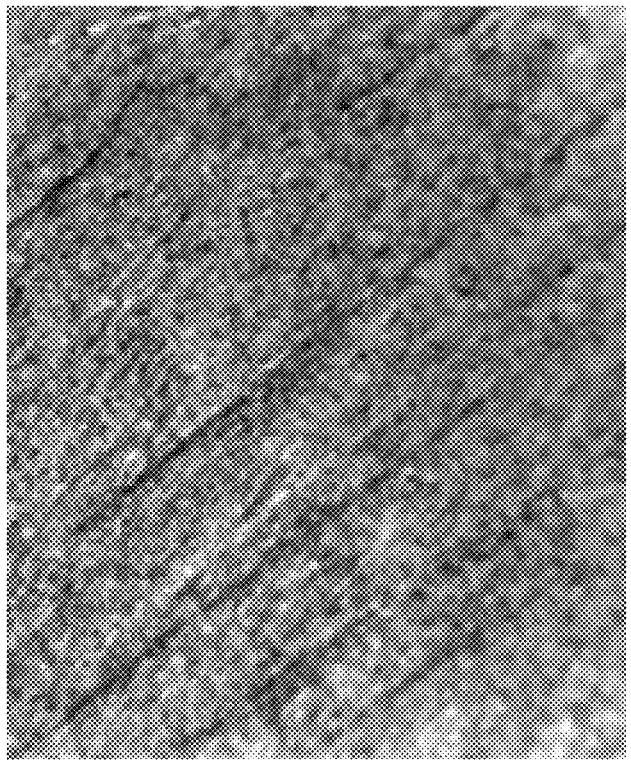
FIG. 4B is a SEM image of the metal after immersion in an acidic solution in the presence of the composition.
Figure 4A:
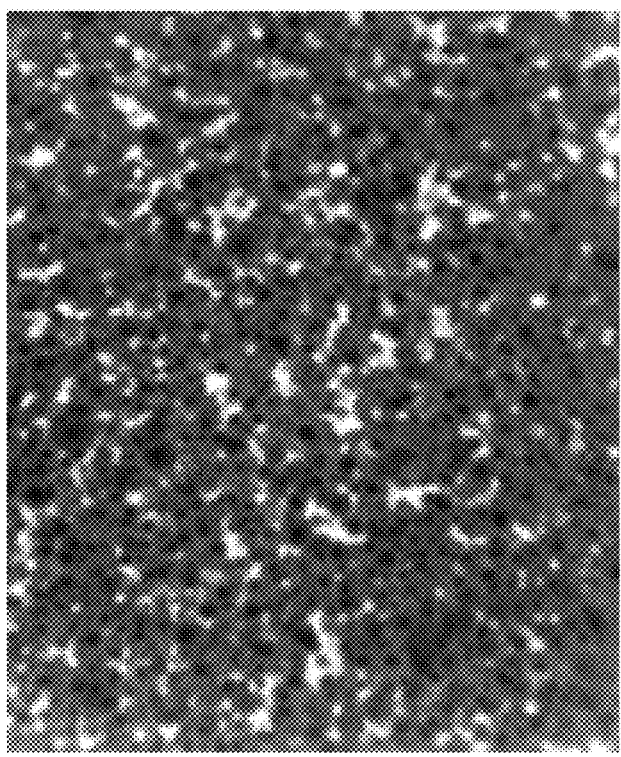
FIG. 4A is a SEM image of the metal after immersion in an acidic solution in the absence of the composition.

Mild steel of composition (wt. %): $C \leq 0.2\%$, $Si \leq 0.02\%$, $Mn \leq 0.1\%$, $P \leq 0.01\%$, $Cr \leq 0.06\%$, $Ni \leq 0.04\%$, $Al \leq 0.03\%$ and the remainder iron, was used for the corrosion tests. A solution was suspended inside the test cell, filled with acid and water, then the corrosion inhibitor was added. The test cell placed in a water bath at 30° C. Results are listed in FIG. 1 in a table 100. After 1 hour the polarization (PDP) 104 and impedance (EIS) 106 measurements, were recorded. FIGS. 1-3 list and diagram the results. In addition, anticorrosion activity was determined by measuring metal surface degradation using scanning electron microscope (SEM) analysis (FIG. 4A and FIG. 4B).

FIGS. 1-4 present the results of the anticorrosive effect of wood tar oil of *O. europaea* subsp. Cuspidate, determined by using PDP 104, EIS 106 and SEM measurements at concentration (1%-10% v/v) 102. Wood tar oil of *O. europaea* subsp. Cuspidate extract acts as an effective corrosion inhibitor for mild steel in 1 M $H_2SO_4$ containing 10% EtOH. The maximum inhibition efficiency was 94.97%. There was good agreement between PDP and EIS used to calculate the inhibition efficiencies 108. The inhibition may be due to the adsorption of the inhibitor molecules on mild steel surface which may be blocking the active sites on the surface of the mild steel. The adsorption of the organic inhibitor on mild steel surface may be characterized by the decrease in the cathodic current densities observed in the potentiodynamic polarization curves carried out in the presence of wood tar oil of *O. europaea* subsp. Cuspidate, the polarization resistance in the solutions containing the inhibitor, and the double-layer capacitance computed from electrochemical impedance spectroscopy experiments. It is clearly seen from SEM images (FIG. 4A and FIG. 4B) that the irregularities in the surface due to corrosion in FIG. 4A is absent in the inhibited surface in FIG. 4B and the surface is almost free from corrosion in FIG. 4B. *O. europaea* subsp. Cuspidate may have an inhibitory effect on the dissolution of the metal. The inhibitory effect may be attributed to the presence of active phytochemical compounds in the *O. europaea* subsp. Cuspidate wood tar oil. The anticorrosion mode of action recorded herein may suggest that a protective layer of the composition of wood tar oil and the alcohol solvent form on a surface of the metal with no effect on metal composition.

The results indicate that wood tar oil of *O. europaea* subsp. Cuspidate is an excellent mild steel anticorrosive in $H_2SO_4$ acid.

The invention claimed is:

1. A composition comprising:
   a wood tar oil from an *Olea europaea* subsp. *Cuspidata* plant, wherein the wood tar oil is present in 5%-80% v/v relative to the total volume of the composition; and
   an alcohol solvent that is present in 10%-95% v/v relative to the total volume of the composition;
   wherein the composition has a coating resistance of greater than 2.5 ohms and inhibits corrosion of a metal.

2. The composition of claim 1, further comprising a dispersant.

3. The composition of claim 2, wherein the dispersant is at least one of an anionic surfactant, a cationic surfactant, a neutral surfactant, and a gemini surfactant.

4. The composition of claim 3, wherein the dispersant is present in at least 0.5%-10% v/v relative to the total volume of the composition.

5. The composition of claim 1, further comprising at least one inorganic inhibitor compound selected from the group consisting of a phosphate ester-containing compound, a silicate-containing compound, a molybdenum-containing compound, and a boric acid-containing compound, wherein the inorganic inhibitor compound inhibits dissolution and acid depletion of the metal.

6. The composition of claim 5, wherein the inorganic inhibitor is present in 0.5%-10% v/v relative to the total volume of the composition.

7. The composition of claim 1, further comprising at least one organic inhibitor compound selected from the group consisting of an amine-containing compound, a heterocyclic nitrogen-containing compound, a sulfur-containing compound, an acetylenic compound, and an aldehyde compound, wherein the organic inhibitor compound inhibits dissolution and acid depletion of the metal.

8. The composition of claim 7, wherein the organic inhibitor compound is present in 0.5%-10% v/v relative to the total volume of the composition.

9. The composition of claim 1, wherein the wood tar oil has a viscosity between 1.2 and 2.0 millipoise.

10. The composition of claim 1, wherein the wood tar oil is modified by at least one chemical modification selected from the group consisting of hydrogenation, epoxidation, hydroxylation, halogenation, sulfonation, phosphorylation, and amidation.

11. The composition of claim 1, further comprising an anti-sealant compound, wherein the anti-sealant compound is present in 0.5%-10% v/v relative to the total volume of the composition.

12. The composition of claim 1, wherein the composition is formulated into a paint, a polymer coating, or an epoxy.

13. The composition of claim 1, wherein the metal is a low to medium carbon steel with a carbon content of 0.04%-0.6% by weight.

14. A method for inhibiting corrosion of a metal, comprising
   contacting a metal surface with the composition of claim 1.

15. The method of claim 14, wherein the composition further comprises 0.5%-10% v/v of at least one of a dispersant, an organic inhibitor compound, an inorganic inhibitor compound, and an anti-sealant compound, relative to the total volume of the composition.

16. The method of claim 14, wherein the composition has a temperature between 20° C.-40° C. when the composition is contacting the metal.

17. The method of claim 14, wherein the contacting includes dipping, brushing, spraying, painting, or spin coating the metal surface with the composition.

18. The method of claim 14, further comprising contacting the metal surface with a secondary anti-corrosive compound after contacting the metal surface with the composition.

* * * * *